US011178368B2

(12) United States Patent
Gera et al.

(10) Patent No.: US 11,178,368 B2
(45) Date of Patent: Nov. 16, 2021

(54) AUTOMATIC DIGITAL PARAMETER ADJUSTMENT INCLUDING TONE AND COLOR CORRECTION

(71) Applicant: Adobe Inc., San Jose, CA (US)

(72) Inventors: Pulkit Gera, Dehradun (IN); Oliver Wang, Seattle, WA (US); Kalyan Krishna Sunkavalli, San Jose, CA (US); Elya Shechtman, Seattle, WA (US); Chetan Nanda, New Delhi (IN)

(73) Assignee: Adobe Inc., San Jose, CA (US)

( * ) Notice: Subject to any disclaimer, the term of this patent is extended or adjusted under 35 U.S.C. 154(b) by 155 days.

(21) Appl. No.: 16/696,160

(22) Filed: Nov. 26, 2019

(65) Prior Publication Data

US 2021/0160466 A1 May 27, 2021

(51) Int. Cl.
*H04N 9/31* (2006.01)
*G06T 5/00* (2006.01)
*H04N 9/73* (2006.01)

(52) U.S. Cl.
CPC ........... *H04N 9/3182* (2013.01); *G06T 5/009* (2013.01); *H04N 9/73* (2013.01); *G06T 2207/20081* (2013.01)

(58) Field of Classification Search
CPC ........ H04N 9/73; H04N 9/3182; G06T 5/009; G06T 2207/20081
See application file for complete search history.

(56) References Cited

U.S. PATENT DOCUMENTS 9,292,911 B2 * 3/2016 Paris ................. G06K 9/00275
2019/0362478 A1 * 11/2019 Nanda ...................... G06T 7/90

OTHER PUBLICATIONS

"Adobe Premiere Pro—Video Editing", Retrieved at https://www.adobe.com/in/products/premiere.html—on Aug. 28, 2019, 10 pages.
Bychkovsky,"Learning photographic global tonal adjustment with a database of input/output image pairs", Proceedings of the 2011 IEEE Conference on Computer Vision and Pattern Recognition, Jun. 2011, pp. 97-104.
Chen,"Deep Photo Enhancer: Unpaired Learning for Image Enhancement from Photographs with GANs", Proceedings of the IEEE Conference on Computer Vision and Pattern Recognition. 2018, Jun. 2018, 9 pages.

(Continued)

*Primary Examiner* — Brenda C Bernardi
(74) *Attorney, Agent, or Firm* — FIG. 1 Patents

(57) ABSTRACT

Systems and techniques for automatic digital parameter adjustment are described that leverage insights learned from an image set to automatically predict parameter values for an input item of digital visual content. To do so, the automatic digital parameter adjustment techniques described herein captures visual and contextual features of digital visual content to determine balanced visual output in a range of visual scenes and settings. The visual and contextual features of digital visual content are used to train a parameter adjustment model through machine learning techniques that captures feature patterns and interactions. The parameter adjustment model exploits these feature interactions to determine visually pleasing parameter values for an input item of digital visual content. The predicted parameter values are output, allowing further adjustment to the parameter values.

20 Claims, 8 Drawing Sheets

(56) References Cited

OTHER PUBLICATIONS

He, "Deep Residual Learning for Image Recognition", Proceedings of the IEEE conference on computer vision and pattern recognition, 2016., Dec. 10, 2015, 12 pages.
Li, "A Closed-form Solution to Photorealistic Image Stylization", Jul. 27, 2018, 23 pages.
Luan, "Deep Photo Style Transfer", Apr. 11, 2017, 9 pages.

* cited by examiner

AUTOMATIC DIGITAL PARAMETER ADJUSTMENT INCLUDING TONE AND COLOR CORRECTION

BACKGROUND

Computing devices are utilized for many different computer applications, including content editing systems for graphic design, publication development, digital photo image enhancement, digital video frame enhancement, and so forth. For instance, computing devices can be leveraged to implement content editing systems that provide a variety of tools that enable modification of vast amounts of digital visual content, such as tools for modifying visual characteristics of digital content. One primary way in which content editing systems enable modification of visual characteristics is through representation of the characteristics via parameterization. For instance, systems often parameterize different visual characteristics and expose components with which a user can interact to adjust values of the parameters. Examples of such parameters include exposure, contrast, highlights, shadows, whites, blacks, vibrance, contrast, clarity, brightness, saturation, and so forth. Responsive to adjustment of a parameter (e.g., via a slider), content editing systems modify the corresponding visual characteristics of the digital image. Oftentimes users adjust parameters so that their digital images (or collections of their digital images) have a consistent "look and feel" or fit a particular "style".

SUMMARY

Systems and techniques for automatic digital parameter adjustment are described that leverage insights learned from an image set to automatically predict parameter values for an input item of digital visual content. These techniques overcome the limitations of conventional image adjustment systems which are manual or cumbersome to use or are based on hardcoded algorithms that do not consider contextual information. To do so, the automatic digital parameter adjustment techniques described herein capture visual and contextual features of digital visual content to determine balanced visual output in a range of visual scenes and settings. The visual and contextual features of digital visual content are used to train a parameter adjustment model through machine learning techniques, which captures feature patterns and interactions that a human cannot practically detect. The parameter adjustment model exploits these feature interactions to determine visually pleasing parameter values for an input item of digital visual content, such as for use in digital image editing. The predicted parameter values are output, allowing a user to further adjust the parameter values if they do not result in a visually pleasing result.

This summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
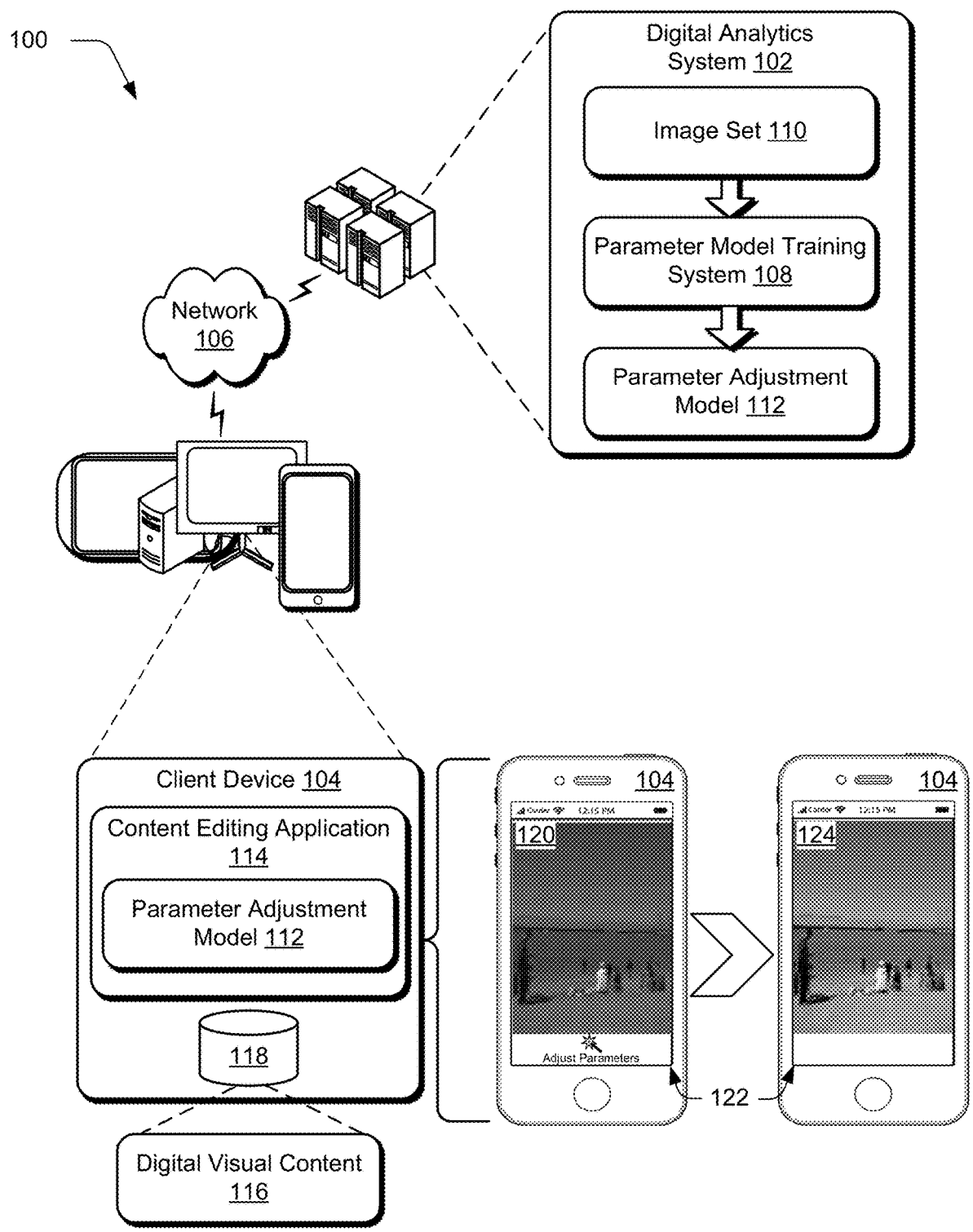
FIG. 1 is an illustration of an environment in an example implementation that is operable to employ automatic digital parameter adjustment techniques as described herein.

Conventionally configured content creation systems include tools for altering the appearance of digital visual content, e.g., a digital image. For example, some conventional systems allow a user to specify visual parameters used to alter the digital image. For instance, editing visual parameters of a digital image requires expertise to change overall color appearance without changing a skin tone of persons depicted in the image, and attributes that make an image visually pleasing may vary based on context (e.g., a visually pleasing indoor scene including people will have different attributes than a visually pleasing outdoor nature scene), and so forth.

Graphic designers, artists, and colorists often edit visual parameters of photographs and/or video frames (e.g., digital images) to stylize them and achieve a desired visual look, such as when using editing applications like Adobe Photoshop® and Lightroom® for digital image creation and editing, or Adobe Premier Pro® for video editing. However, the process to edit the visual parameters of a photo image can require a great deal of creative input time and user expertise to create an edited image or video frame. Conventional systems include functionality for automatic adjustment of tonal properties, but typically fail to account for other primal factors such as white balance, saturation, and so forth. These systems are further based on algorithms that typically fail to consider contextual information, such as how styles may be applied to an image depicting a sky versus an image depicting an indoor scene. This can cause the resulting images generated by these systems to appear to have inconsistent styles, or produce unrealistic artifacts, resulting in a poor user experience when using an application as an assistive editing tool. Further, these systems directly output an altered image, removing control from a user and failing to provide a mechanism to adjust for inconsistent or poor visual results.

Accordingly, since conventional content editing applications are unable to accurately adjust visual parameters of an image, users of conventional content editing applications are forced to manually adjust image parameters, consuming a great deal of the user's time in addition to wasting resources of a computing device implementing the content editing application. For instance, a user manually adjusting visual parameters of an image typically adjusts a single parameter at a time, generating a new altered image each time a parameter is adjusted. Further, each time a parameter is adjusted, the relative importance of each other parameter value is changed, leading to an iterative process requiring creation of dozens or hundreds of altered images before the user has finished adjusting the visual parameters.

Thus, conventional content editing systems not only present a suboptimal user experience for editing digital images, but also result in reduced device and network performance due to inefficient manual adjustment procedures.

To overcome these problems, automatic digital parameter adjustment systems and techniques are described in which a digital analytic system leverages insights learned from an image set. These insights may be leveraged to automatically predict parameter values for an input item of digital visual content. To do so, the digital analytics system generates a parameter adjustment model by processing an image set including data corresponding to image content depicting images before modification (i.e., a base image) as well as image content after modification by a professional (i.e., a corrected image). Example data structures capable of capturing this image content include raw images, which include file format types such as .raw, .dng, .crw, .org, and so on.

Although generation of the corrected image may have included altering an image with parameters (for example exposure, contrast, highlights, shadows, whites, blacks, vibrance, contrast, clarity, brightness, saturation, and so forth), the image set does not need to include data describing these parameters or including values associated with the parameters. In this way, the automatic digital parameter adjustment techniques generates the parameter adjustment model without having access to information pertaining to the creation of the corrected image. For example, the parameter adjustment model is created without knowledge of an application used to generate the corrected image, parameters used to generate the corrected image, or parameter values used to generate the corrected image. This allows the use of any image set in the training of the parameter adjustment model.

For each base image, the digital analytics system processes the image with machine learning to generate parameter values, applies the parameter values to the base image to generate a modified image, and compares the modified image to the corrected image from the image set. Based on this comparison, algorithms, features, or parameters used to generate the image parameter values are altered to iteratively improve the parameter values and reduce a difference in comparison between the modified image and the corrected image. For example, the digital analytics system utilizes a machine learning module and a loss function to learn a parameter adjustment model.

The parameter adjustment model, once trained, processes an input image (e.g., an image that was not used to train the parameter adjustment model) to derive insights into the input image and generate predicted parameter values. The predicted parameter values are utilized, e.g., by a content editing application, to modify the input image and generate an adjusted image. The predicted parameter values are output (e.g., to a user of a client device), allowing a user to view and modify that predicted parameter values. As the parameter adjustment model does not directly output an adjusted image, a user may further fine-tune or tweak the predicted parameter values to further adjust the image. In this way, both amateurs and professionals benefit from the parameter adjustment model, reducing time spent in production and in turn allow more time and effort to be devoted to other creative aspects.

The described techniques thus remedy inefficiencies and resource wastage experienced in typical image sharing systems. User device resources are conserved since a user is initially presented with parameter values that result in a visually pleasing image. Thus, a user isn't forced to engage in repeated manual parameter adjustments, which can unnecessarily burden device resources such as processor bandwidth and network bandwidth utilized to process and communicate such requests. For example, by reducing the excessive amount of user interaction required by manual adjustment techniques, system resources such as data storage, memory, processor bandwidth, and network bandwidth used to store, process, and communicate digital images are conserved. Such resources are conserved, for example, since they are not utilized for repeated creation of altered images each time a user manually adjusts a parameter.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Term Examples

Example descriptions or explanations of certain terms as used herein are set forth below. Each term is applicable to one or more, but not necessarily all, implementations that are presented herein. Some terms are further described using one or more examples.

"Digital visual content" refers to any electronic media content that includes a visible creation such as a design or an electronic file that embodies the visible creation. Examples of digital visual content include digital graphics, digital images, digital images that include graphics, digital videos, and so forth. Examples of digital graphics include, but are not limited to, vector graphics, raster graphics (e.g., digital photographs), layouts having different types of graphics, and so forth. A "base" item of digital visual content generally refers to digital visual content that has not been altered or edited. However, reference to a "base" item of digital visual content may be relative to a system utilizing the item of digital visual content. For example, an item of digital visual content that has been received by a content editing application may be considered a "base" item of digital visual content if it has not been altered or edited by the content editing application, regardless of alterations performed prior to receipt by the content editing application. A "corrected" item of digital visual content generally refers to an item of digital visual content that has been altered or edited by a colorist or other digital image editing professional.

A "parameter" is any measurable factor usable to alter digital visual content, and may include factors for altering digital visual content by sharpening or softening, changing a color depth, changing contrast or brightness, changing gamma, adjusting colors, and so forth. Example parameters for adjusting color or white balance include the parameters of 'temperature' and 'tint'. Example parameters for tonal adjustments include 'exposure', 'contrast', 'highlights', 'shadows', 'whites', and 'blacks'. An example parameter for adjusting color fullness or intensities is 'saturation'. A particular item of digital visual content may be associated with particular values for various parameters.

"Machine learning" refers to a computer representation that can be tuned (e.g., trained) based on inputs to approximate unknown functions. In particular, the term "machine learning model" can include a model that utilizes algorithms to learn from, and make predictions on, known data by analyzing the known data to learn to generate outputs that reflect patterns and attributes of the known data. For instance, a machine learning model can include but is not limited to, decision trees, support vector machines, linear regression, logistic regression, Bayesian networks, random forest learning, dimensionality reduction algorithms, boosting algorithms, artificial neural networks, deep learning, etc. Thus, a machine learning model makes high-level abstractions in data by generating data-driven predictions or decisions from the known input data.

Example Environment

FIG. 1 is an illustration of a digital medium environment 100 in an example implementation that is operable to employ automatic digital parameter adjustment techniques in a digital medium environment as described herein. The illustrated environment 100 includes a digital analytics system 102 and a plurality of client devices, an example of which is illustrated as client device 104. These devices are communicatively coupled, one to another, via a network 106 (e.g., the Internet) and computing devices that implement these systems and devices may assume a wide variety of configurations.

A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as shown for the digital analytics system 102 and as further described in FIG. 8.

In at least some implementations, the digital analytics system 102 includes a parameter model training system 108 that is configured to process an image set 110 to create a parameter adjustment model 112. In order to create the parameter adjustment model 112, for instance, the parameter model training system 108 utilizes a machine-learning model using the image set 110 as training data to extract features from images of the image set 110, identify patterns that are not recognizable by a human, and represent those patterns via the parameter adjustment model 112. The parameter adjustment model 112, for instance, is configured to identify meaningful features or patterns in an input image and use those features or patterns to create an adjusted set of parameters corresponding to the image. The machine learning model may be configured in a variety of ways, such as a neural network (e.g., a deep-learning neural network), statistical model (e.g., using linear regression), and so forth as further described with respect to FIG. 2.

The parameter adjustment model 112 may be configured to process digital visual content, characterize features of the digital visual content, and determine a set of parameters for use in conjunction with the digital visual content. In some implementations, an instance of the trained parameter adjustment model 112 is included as part of a content editing application 114 on the client device 104. The content editing application 114, for instance, is configured to support user interaction with digital visual content 116, which may be stored in a stored device 118. By way of example, the content editing application 114 includes functionality to edit digital visual content, such as digital graphics, digital images, digital images that include graphics, digital videos, and so forth. Examples of digital graphics include, but are not limited to, vector graphics, raster graphics (e.g., digital photographs), layouts having different types of graphics, and so forth. In at least some implementations, the digital visual content 116 includes a digital image or a digital video, and the content editing application 114 is configured to view or edit digital images or video (for example, Adobe Photoshop® or Lightroom® for digital image creation and editing, Adobe Premier Pro® for video editing, and so forth).

Further, the content editing application 114 may enable a client device user to interact with application interfaces presented via the client device 104 to perform content editing operations, such as selecting portions of digital content, removing selected portions of the digital content, modifying characteristics or parameters (e.g., color, blur, saturation, brightness, and so on) of selected portions of the digital content, selecting options to perform automatic modifications of the digital content, and so forth. The content editing application 114 may facilitate other content editing operations without departing from the spirit or scope of the techniques described herein. The content editing application 114 may further be representative of more than one application (e.g., a suite of applications) that supports functionality to perform content editing operations on various types of digital content without departing from the spirit or scope of the techniques described herein.

At least some of the digital content, relative to which the content editing application 104 is configured to perform operations, is represented by the digital visual content 116. Although the digital visual content 116 is illustrated as being maintained in the storage 118, the digital visual content 116 may also represent digital visual content accessible to the client device 104 in other ways, e.g., accessible to the client device 104 from storage of another device over the network 106.

The digital visual content 116 may represent various types of digital content without departing from the spirit or scope of the techniques described herein. The digital visual content 116 is depicted with digital photograph 120, for instance, which is also depicted being displayed via a display device 122 of the client device 104 at a first time. The display device 122 is also depicted displaying a modified digital photograph 124 at a second time, which is after the first time. This represents a scenario in which the digital photograph 120 is altered to produce the modified digital photograph 124 by using the parameter adjustment model 112. Although illustrated as implemented locally at the client device 104, functionality of the illustrated parameter adjustment model 112 may also be implemented in whole or part via functionality available via the network 106, such as part of a web service or "in the cloud".

As discussed in more detail below, the parameter adjustment model 112 may generate predicted parameters for use in modifying the digital photograph 120. In at least some implementations, the content editing application 114 utilizes these predicted parameters to create the modified digital photograph 124. An example content editing application 114 utilizes nine parameters. These example parameters include color and white balance parameters of 'temperature' and 'tint', tonal adjustment parameters of 'exposure', 'contrast', 'whites', and 'blacks', and a color fullness/intensity parameter of 'saturation'.

The parameter adjustment model 112 is capable, in at least some implementations, of generating the predicted parameters based on a single input image, and may predict all parameters utilized by the content editing application 114 while incorporating contextual information. This contrasts with conventional approaches to image editing, which may adjust only tonal properties of an image, require manual inputs by a user that are prone to error, or utilize algorithms that do not account for contextual information.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
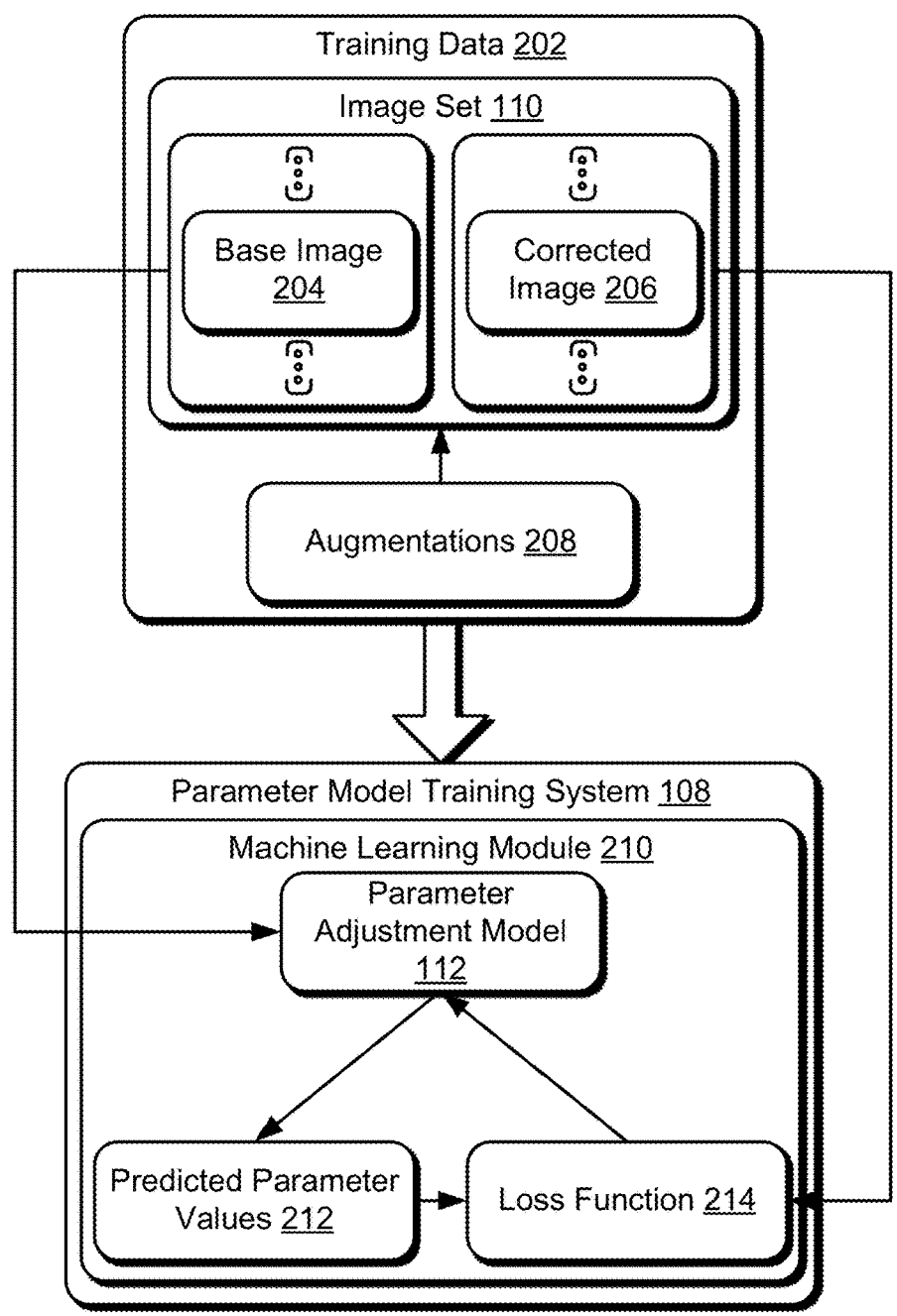
FIG. 2 depicts an example system showing a parameter model training processing pipeline of the digital analytics system of FIG. 1 in greater detail.

FIG. 2 depicts a system 200 showing an example parameter model training processing pipeline of the parameter model training system 108 of FIG. 1 in greater detail to create the parameter adjustment model 112.

In at least some implementations, the parameter model training processing pipeline begins with an input of training data 202. The training data 202 includes, for instance, the image set 110 of FIG. 1. The image set 110 includes a plurality of base images 204 along with a plurality of corrected images 206. A base image 204 is a captured image that has not been edited, enhanced, altered, 'touched up', or so forth. A corrected image 206 corresponds to the base image 204, and has been adjusted or enhanced by a colorist to achieve a visually pleasing version of the base image 204. The image set 110 may include images from a broad range of scenes, subjects, lighting conditions, and so forth. An example image set 110 is the MIT-Adobe FiveK Dataset, which contains 5,000 base photographs (e.g., the base images 204), each of which has been adjusted by 5 different expert colorists to create a total of 25,000 adjusted images (e.g., the corrected images 206). In this example, the image set 110 is reduced to include a single corrected image 206 corresponding to each respective base image 204. The image set 110 may include, for example, images in a Digital Negative (DNG) format, images that have been converted from a DNG format into JPEG files, and so forth.

In at least some implementations, augmentations 208 are applied to the images of the image set 110 to ensure robustness and prevent overfitting of data by the parameter model training system 108. For instance, the augmentations 208 include random flips (e.g., flipping an image in the left, right, up, or down directions), random cropping of images, resizing of images (e.g., resizing each image or cropped image to a uniform size such as 224 pixels by 224 pixels), providing randomly assigned parameter values such as brightness, contrast, hue, saturation, and so forth. Some of the augmentations 208 may be applied uniformly between a base image 204 and its corresponding corrected image 206, such as to flip or crop the base image 204 and the corrected image 206 in the same manner Others of the augmentations 208 may be applied differently between the base image 204 and its corresponding corrected image 206, such as to adjust the brightness and saturation of the base image 204 without adjusting the brightness and saturation of the corrected image 206, and so forth.

The training data 202 may be input to the parameter model training system 108 to create the parameter adjustment model 112. For example, the MIT-Adobe FiveK Dataset is converted from DNG to JPEG files using Adobe Lightroom®, and the JPEG files are read and fed into the parameter model training system 108 by using TensorFlow. In order to create the parameter adjustment model 112, the parameter model training system 108 may employ a machine learning module 210 that is configured to process the training data 202. By analyzing features of the image set 110 (e.g., at various levels of abstraction or depths within levels of a neural network) the parameter adjustment model 112 can generate predicted parameter values based on an input image. In this example, the parameter adjustment model 112 when provided with the training data 202 as an input thus creates predicted parameter values 212 for respective base images 204 within the training data 202. To verify the accuracy of the predicted parameter values 212, the machine learning module 210 may compare the predicted parameter values 212 with the corrected images 206.

For instance, the machine learning module 210 can determine the differences between the predicted parameter values 212 and the corrected images 206 by utilizing a loss function 214 to determine a measure of loss (e.g., a measure of difference such as a mean square error or mean absolute loss). For example, the machine learning module 210 can apply the predicted parameter values 212 to the base image 204 and perform a pixel-wise comparison to the corrected image 206, can extract parameter values from the corrected image 206 and compare the extracted parameter values with the predicted parameter values 212, and so forth. The machine learning module 210 may use the loss function 214 (e.g., uses the measure of loss resulting from the loss function 214) to train the parameter adjustment model 112. In particular, the machine learning module 210 can utilize the loss function 214 to correct parameters or weights used in training the parameter adjustment model 112 that resulted in incorrect predicted parameter values 212. The machine learning module 210 can use the loss function 214 to modify one or more functions or parameters, such as to modify one or more functions or parameters in its prediction algorithms to minimize the loss function 214 and reduce the differences between the predicted parameter values 212 and the corrected image 206. In this way, the machine learning module 210 may employ the loss function 214 to learn the parameter adjustment model 112 through processing of the training data 202. Once trained, the parameter adjustment model 112 may then be used in this instance to transform a base image into predicted parameter values.

The parameter model training system 108 can use any type of machine-learning techniques capable of processing input visual content. According to various implementations, the parameter model training system 108 uses supervised learning, unsupervised learning, or reinforcement learning. For example, the machine learning module 210 can include, but is not limited to, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc.

In any case, the parameter model training system may use machine-learning techniques to continually train and update the parameter adjustment model 112 to produce accurate predictions of parameter values for an input image.

Figure 3:
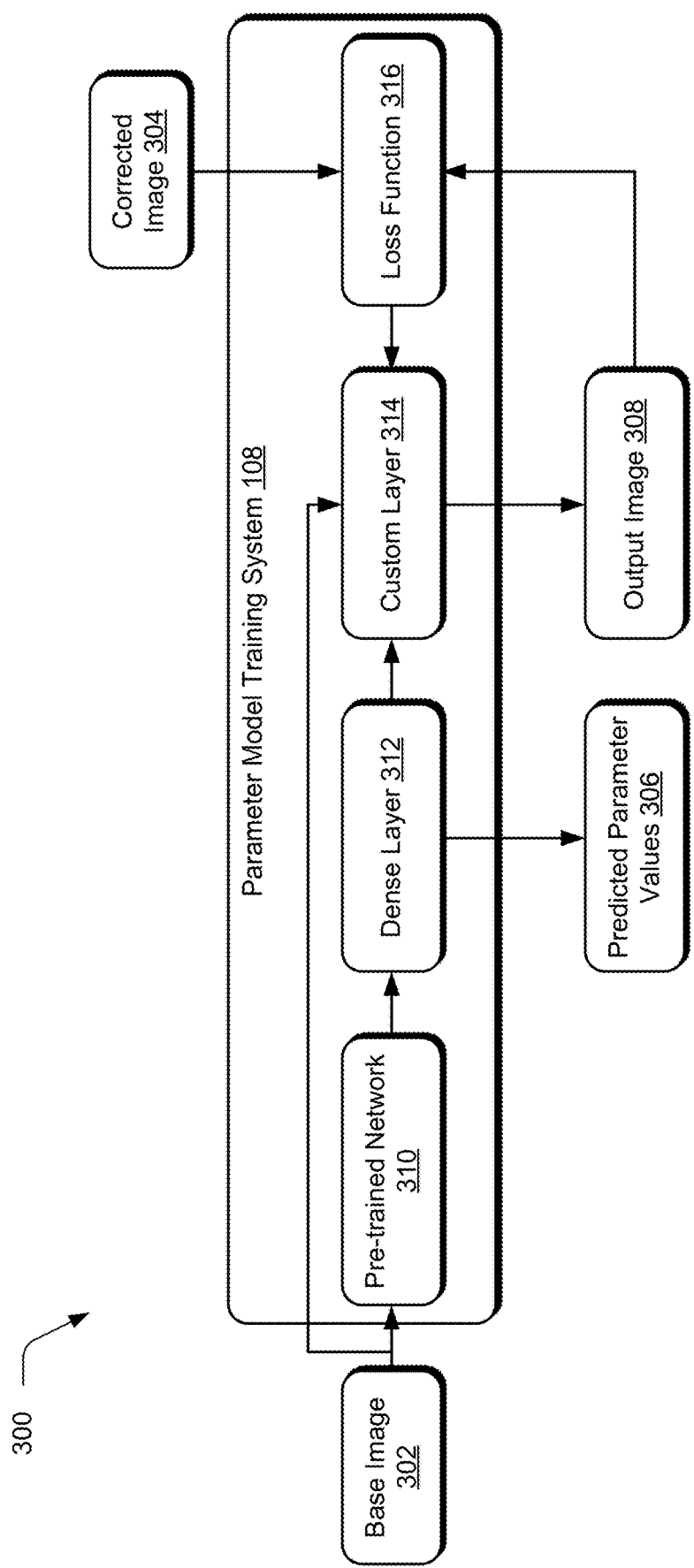
FIG. 3 depicts an example system showing an example machine learning network of the parameter model training system of FIG. 1 in greater detail.

FIG. 3 depicts a system 300 showing an example machine learning network of the parameter model training system 108. In this example, the parameter model training system 108 receives inputs of a base image 302 and a corrected image 304 to produce outputs of predicted parameter values 306 and an output image 308. The base image 302 and the corrected image 304 may be, for instance, the base image 204 and the corrected image 206, respectively, of FIG. 2.

In at least some implementations, the base image 302 is input to a pre-trained network 210. For example, the pre-trained network 210 is a pre-trained convolutional neural network (e.g., ResNet—50). The pre-trained network 210 converts the base image 302 into a vector representation (in at least some implementations, a 2048-dimensional encoding vector) of the image. A dense layer 312 may ingest the vector representation of the image into a lower-dimensional vector representation corresponding to image adjustment parameters (e.g., for a content editing application 114 with nine parameters, the dense layer 312 creates a nine-dimensional vector representation such that each dimension corresponds to a parameter). In at least some implementations, the dense layer 312 has sigmoid activation so the output values are in a range of [0,1].

The dense layer 312 may output the vector representation as predicted parameter values 306, and may forward the vector representation to a custom layer 314. In at least some implementations, the custom layer 314 receives as input the vector representation from the dense layer 312, and also receives the base image 302. The custom layer 314, for example, scales the parameters in the vector representation according to a particular content editing application 114 (i.e., converts the [0,1] values in the vector representation into values on a different scale usable by the content editing application 114). The custom layer 314 may apply the scaled parameters to the base image 302 (e.g., by using a module of code associated with the content editing application 114) in order to create the output image 308.

In at least some implementations, a loss function 316 compares the output image 308 with the corrected image 304. It is to be appreciated that although a trained parameter adjustment model generates the predicted parameter values, the parameter model training system 108 may additionally generate the output image 308 for use by the loss function 316. In at least some implementations, the loss function 316 includes the mean squared pixel-wise loss between the corrected image 304 and the output image 308, and summing over all the pixels as expressed by the following equation:

$$\text{MSE Loss } (L) = \frac{1}{BHWC} \sum_{b=0}^{B} \sum_{h=0}^{H} \sum_{w=0}^{W} \sum_{c=0}^{C} (I_{gt}(b, h, w, c) - I_{out}(b, h, w, c))^2$$

In the above equation, L represents the mean squared loss and B represents the batch size (e.g., a number of images fed through the model at a time, such as 8 or 16 images). $I_{gt}$ is the corrected image 304 and $I_{out}$ is the output image 308, each with dimensions H (height, as a number of pixels), W (width, as a number of pixels), and C (a number of channels). In at least some implementations, the images include RGB channels (a red channel, a green channel, a blue channel, and an alpha channel).

Gradients of loss with respect to the various parameters may be back-propagated by the custom layer 314 in order for the parameter model training system 108 to iteratively improve the predicted parameter values 306 and minimize the loss function 316. In at least some implementations, the custom layer 314 approximates gradients of the output image with respect to each input parameter (e.g., a change in loss with respect to change in a parameter) according to the following equation:

$$\frac{\partial L}{\partial p} = \frac{\partial I_{out}}{\partial p} \times \frac{\partial L}{\partial I_{out}}$$

In the above equation L is the mean square loss, p is the parameter with respect to which gradient is to be calculated, and $I_{out}$ is the output image of the custom layer.

In at least some implementations, the custom layer 314 determines the gradient of the output image with respect to a parameter ($\partial I_{out}/\partial p$) by using a method of central differences according to the following equation:

$$\frac{\partial I_{out}}{\partial p} = \frac{I_{(out, p+\delta)} - I_{(out, p-\delta)}}{2\delta}$$

In the above equation, $I_{out}$ is the output image of the custom layer, p is a parameter with respect to which the gradient is to be calculated, δ is a value by which the parameter p is changed, and $I_{(out, p+\delta)}$ and $I_{(out, p-\delta)}$ are output images of the custom layer when fed with parameter p+δ and p−δ, respectively. In at least some implementations, $$p \in \left\{ \begin{array}{c} \text{temperature, tint, exposure, contrast, highlights} \\ \text{shadows, whites, blacks, saturation} \end{array} \right\}$$

and $\partial I_{out}/\partial p$ is calculated for each of the parameters p. The gradient of the loss with respect to the output image ($\partial L/\partial I_{out}$) may be provided by a framework of the parameter model training system 108 (e.g., an application such as TensorFlow). Thus, in at least some implementations, gradients of loss with respect to the parameters are back-propagated and the network learns to predict parameter values such that the sum of pixel wise loss and the regularization term is minimized. In other words, the custom layer 314 may determine how much the loss changes when a parameter is changed, and utilize this information to train a parameter adjustment model that results in a minimum amount of loss.

The parameter model training system 108 may create multiple or alternative parameter adjustment models. For example, additional parameter adjustment models may be created for sets of corrected images 304 that were generated by different colorists. This is achieved, for instance, by training a new parameter adjustment model utilizing different corrected images 304. As another example, additional parameter adjustment models may be created for use with a different content editing applications by varying the custom layer 314 to incorporate a code module corresponding to the different content editing application.

In this way, the parameter model training system 108 may create a parameter adjustment model using only an input of image pairs (e.g., pairs including a base image 302 and a corrected image 304). Conventional techniques use supervised learning to predict parameters for enhancement, when given a defined set of parameters along with the parameter values for each of a base image and a corrected image. In contrast, the parameter model training system 108 is not confined to a particular set of parameters and does not need or utilize parameter values for the base image 302 or the corrected image 304. Thus, while conventional techniques generally require access to the tools and parameter values used by a professional in creating a corrected image, and are also constrained to learning parameter values for the same tools, the parameter model training system 108 may utilize any image pairs for use in learning parameter values for any application.

As an example, a conventional technique for learning parameter values for an application that utilizes five different parameters requires a base image and a corrected image along with the values for the five parameters for each of the base image and the corrected image. While this alone presents a large hurdle, as colorists may provide a corrected image without specifying an application used to correct the image or the parameter values used, conventional techniques additionally are then constrained to learning output parameters that match the input parameters (e.g., if the input parameters used include values for only tonal properties, the output parameters only include these tonal properties). Thus, conventional techniques require that the colorist use the same content editing application for which parameter values are intended to be predicted. In contrast, the parameter model training system 108 may receive image pairs without knowing parameter values, or even the parameters used in creation of the corrected image 304. In this way, the corrected image 304 may have been created through use of any content editing application, and does not need to align with the content editing application 114 for which the parameter adjustment model 112 is configured. For instance, a content editing application with five parameters may have been used to create the corrected image 304, and the parameter model training system 108 may nonetheless create a parameter adjustment model 112 that uses nine parameters.

Figure 4:
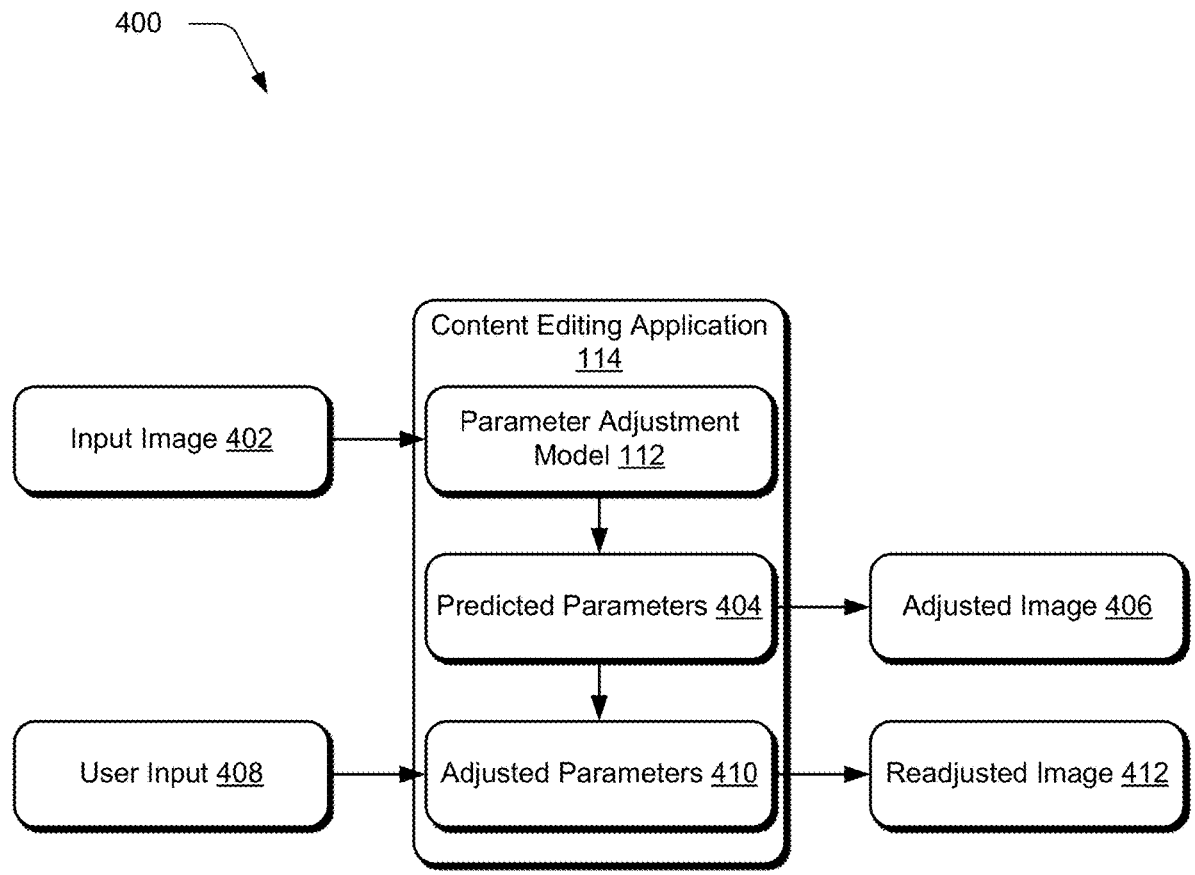
FIG. 4 depicts an example system showing a content editing processing pipeline of the content editing application of FIG. 1 in greater detail.

FIG. 4 depicts a system 400 showing an example content editing processing pipeline of the content editing application 114 of FIG. 1 in greater detail. The content editing application 114 receives an input image 402. Upon receiving a user input, such as an input selecting an option to automatically adjust or correct the input image 402, the content editing application 114 may employ the parameter adjustment model 114 to generate predicted parameters 404 for the input image 402. In at least some implementations, the content editing application 114 applies the predicted parameters 404 to the input image 402, generating an adjusted image 406. The adjusted image 406, for instance, is output to a user of the content editing application 114, such as by displaying the adjusted image 406 on the display device 122 of the client device 104 of FIG. 1.

In at least some implementations, the user of the content editing application 114 is presented a number of options for image adjustment, e.g., options corresponding to a plurality of different parameter adjustment models 112. For instance, the user may select a particular parameter adjustment model 112 when selecting to automatically adjust or correct the input image 402. Alternatively, the content editing application 114 may process the input image 402 with each of the parameter adjustment models 112, generate respective predicted parameters 404 for each model, and output corresponding adjusted images 406. In this example, the user is then presented with different adjusted images 406 and may select an image that is the most visually appealing.

In at least some implementations, the predicted parameters 404 are output to the user of the content editing application 114, e.g., via graphical interface components of a user interface of the content editing application 114 via which a user can provide input to modify a particular parameter, such as a slider bar and/or a text box to modify the particular parameter. Alternatively or additionally, the content editing application 114 may provide interfaces via which a user can provide input to modify a particular parameter in other ways, such as by receiving spoken commands from a user.

In at least some implementations, after viewing the adjusted image 406, the user provides an additional user input 408 to the content editing application to adjust the predicted parameters 404 and generate adjusted parameters 410, e.g. via the graphical interface components of the content editing application 114. As an example, the predicted parameters 404 include a contrast value of −6.14, and the user input 408 adjusts the contrast value to −7.35. The content editing application 114 may apply the adjusted parameters 410 to the input image 402, generating a readjusted image 412. The readjusted image 412 may be output to a user of the content editing application 114, such as by displaying the adjusted image 406 on the display device 122 of the client device 104 of FIG. 1.

In this way, the parameter adjustment model 112 may provide the predicted parameters 404 to a user content editing application 114 and allow the user to further adjust the image. For instance, an amateur photographer may be satisfied with the predicted parameters 404 (i.e., the predicted parameters 404 exceed the amateur's own ability in photo adjustment). An expert colorist, on the other hand, has personalized preferences and a high skill level, and may utilize the parameter adjustment model 112 to generate the predicted parameters 404 as a baseline or as a starting point for further adjustment. This allows non-professionals to enhance image quality to professional levels without requiring the skill or knowledge to use manual or complex workflows available in the content editing application 114, and allows professionals to reduce time spent in creating an initial set of parameters to be further curated. This, in turn, reduces time spent in production and allows professionals to devote more time and effort into other creative aspects of their work.

Although generally described with respect to images, the content editing application 114 and the parameter adjustment model 112 may operate on other forms of digital visual content. For instance, the parameter adjustment model 112 may generated predicted parameters 404 for a video. In an example, the parameter adjustment model 112 determines predicted parameters 404 for a plurality of input images 402 that are each a frame of a video. In another example, the parameter adjustment model 112 determines predicted parameters 404 for an input image 402 that is a frame of a video, and applies the predicted parameters 404 to a plurality of frames of the video. For instance, the parameter adjustment model 112 may be utilized to generate a single set of predicted parameters 404 for the entire video, a set of predicted parameters 404 for each scene of a video, a set of predicted parameters 404 for each minute of a video, and so forth.

Figure 5:
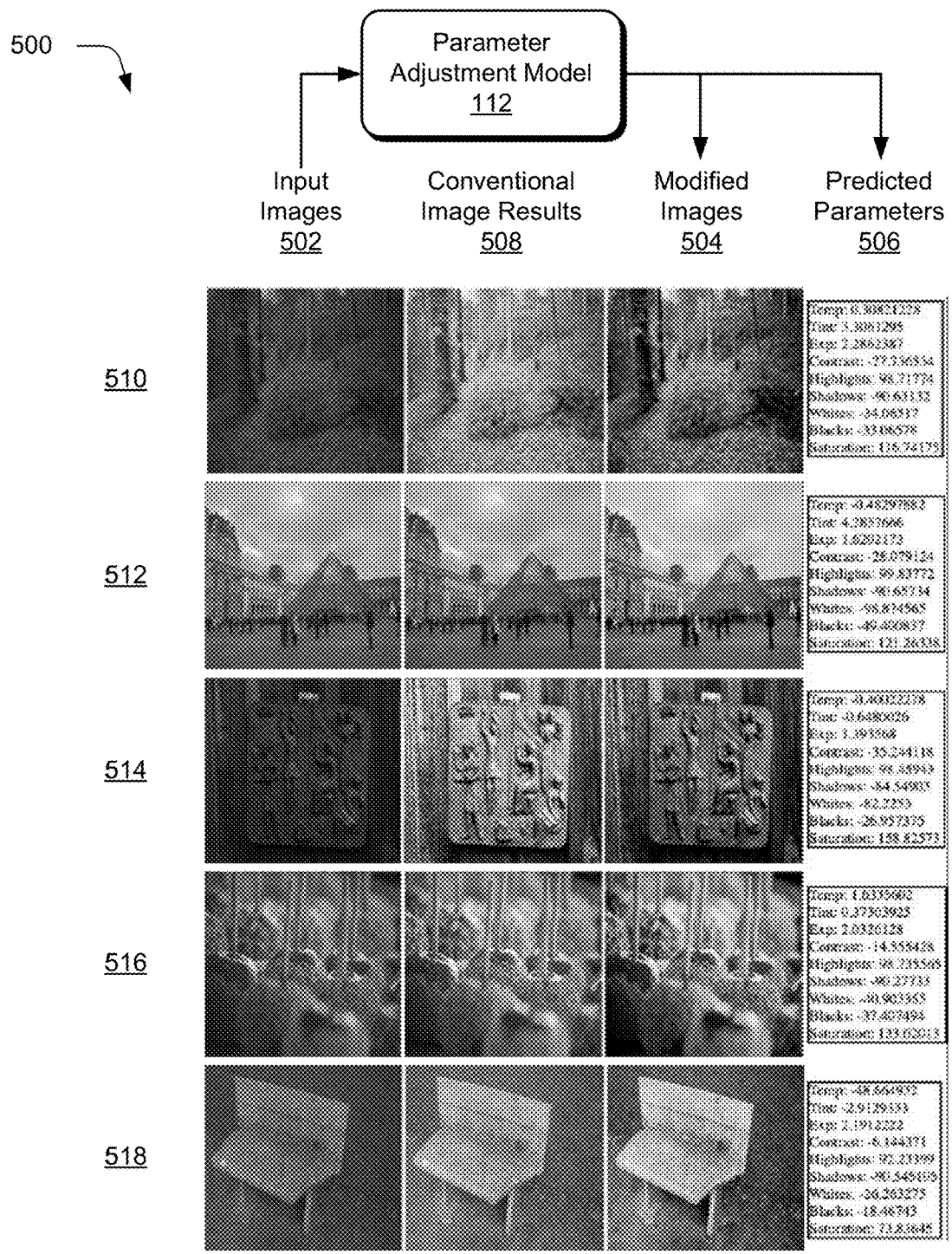
FIG. 5 depicts examples of digital parameter adjustment as implemented by the parameter adjustment model of FIG. 1.

FIG. 5 further illustrates examples 500 of digital parameter adjustment as implemented by the parameter adjustment model 112 of FIG. 1. For discussion purposes, the examples 300 also illustrate a comparison of the quality of a conventional technique for image adjustment. In these illustrated examples, the parameter adjustment model 112 receives an input image 502 that a user wants to visually enhance by digital parameter adjustment.

In at least some implementations, the parameter adjustment model 112 generates a modified image 504 from the input image 502, as generally described with reference to FIGS. 1-4. The parameter adjustment model 112 may be designed to generate the modified image 504 so as to create a visually pleasing image. Six different examples of a respective input image 502, modified image 504, and predicted parameters 506 are shown across six rows in the illustrated examples 500. The results of a conventional technique for image adjustment are also shown for comparison in the six rows of the illustrated examples 500. Conventional image results 508 are shown for techniques that fail to account for contextual information in the input image 502, or adjust only a subset of parameters (e.g., only adjusting tonal parameters without adjusting color and white balance or color fullness/intensity parameters).

In a first row 510 of the example images 500, the input image 502 is an outdoor image of bushes and trees that is dark and difficult to see. The conventional image result 508 has generally increased the brightness of the image while washing out color, whereas the modified image 504 has a generally brighter color scheme that balances all parameter values to achieve vibrant colors. The parameter adjustment model 112 outputs the predicted parameters 506 that are used to create the modified image 504. The second through sixth rows 512-518 of the example images 500 include additional examples wherein the parameter adjustment model generates and outputs predicted parameters 506 for an input image 502, which are used to generate a modified image 504. In each of these examples, the overall image quality of the modified image 504 exceeds that of the conventional image result 508 and provides a more aesthetically pleasing image.

Example Procedures

The following discussion describes techniques that may be implemented utilizing the previously described systems and devices. Aspects of the procedures may be implemented in hardware, firmware, software, or a combination thereof. The procedures are shown as sets of blocks that specify operations performed by one or more devices and are not necessarily limited to the orders shown for performing the operations by the respective blocks. In portions of the following discussion, reference will be made to FIGS. 1-5.

Figure 6:
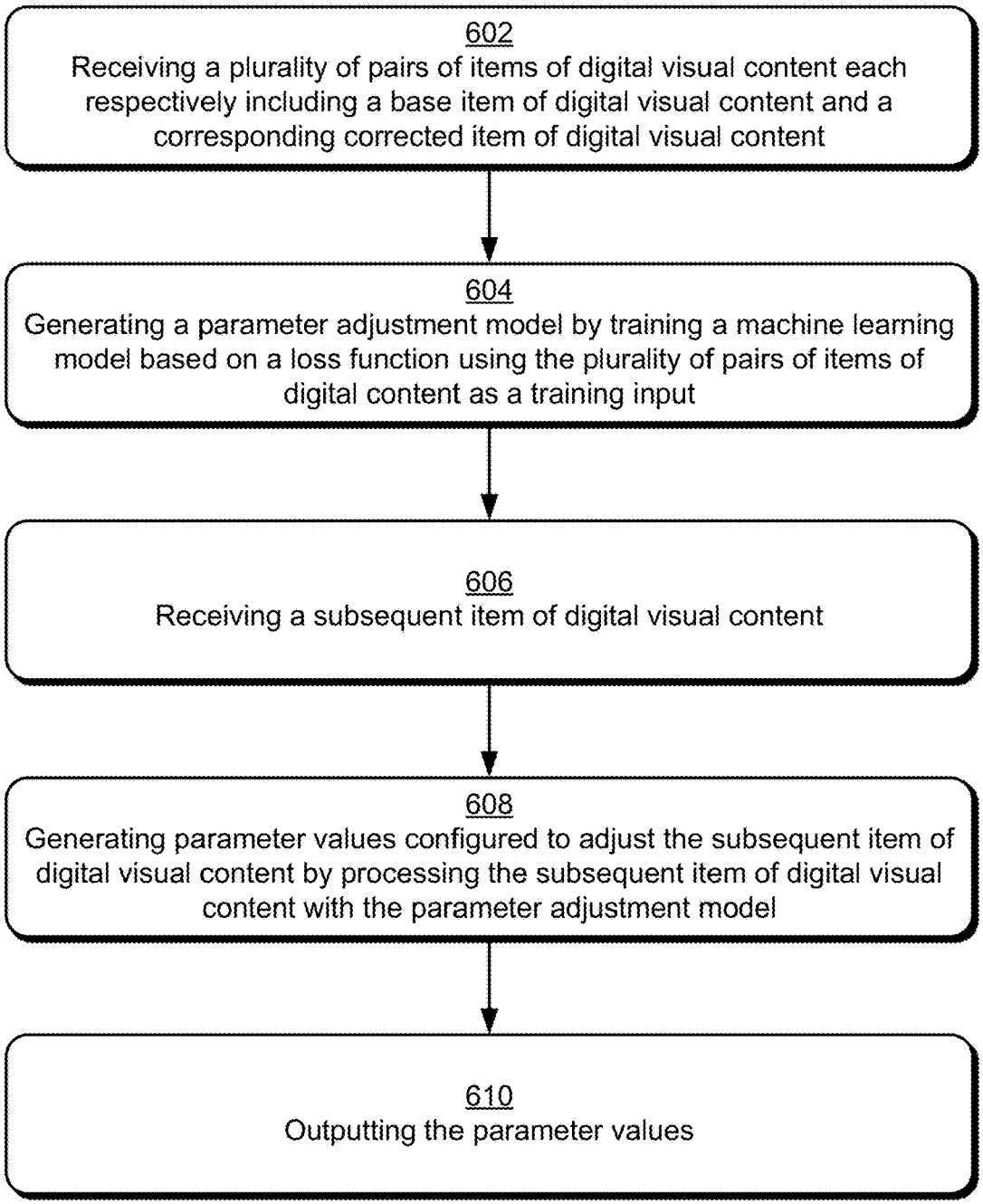
FIG. 6 is a flow diagram depicting a procedure in an example implementation of automatic digital parameter adjustment techniques.

FIG. 6 depicts a procedure 600 in an example implementation of automatic digital parameter adjustment techniques. A plurality of pairs of items of digital content are received, each pair respectively including a base item of digital visual content and a corresponding corrected item of digital visual content (block 602). In at least some implementations, an item of digital content is a digital image, a digital video, or other digital visual content as described with respect to the digital visual content 116 of FIG. 1.

A parameter adjustment model is generated by training a machine learning model based on a loss function using the plurality of pairs of items of digital content as a training input (block 604). In at least some implementations, the machine learning model is a neural network fed into a dense layer and a custom layer such as described with respect to FIG. 4. The parameter adjustment model is configured to receive an input of an item of digital content and output parameter values. For example, the parameter values may correspond to color or white balance parameters, tonal adjustment parameters, and color fullness parameters, such as parameters of temperature, tint, exposure, contrast, highlights, shadows, whites, blacks, and saturation.

The neural network learning process utilizes a machine learning model with a loss function that modifies functions or parameters used to train the parameter adjustment model by minimizing a loss between output values and ground truth values. In doing so, the machine learning model generates predicted parameter values for a base item of digital visual content and compares the predicted parameter values to a corresponding corrected item of digital visual content. For example, the ground truth values correspond to values taken from a corrected image associated with the input image. In at least some implementations where the corrected item of digital visual content does not include parameter values, the machine learning model generates a modified item of digital visual content by applying the predicted parameter values to the base item of digital visual content, and compares the modified item of digital visual content to the corrected item of digital visual content. The machine learning model may then, for instance, utilize the loss function by determining a pixel-wise loss between the modified item of digital visual content and the corrected item of digital visual content.

A subsequent item of digital visual content is received (block 606). The subsequent item of digital visual content is, for instance, an item of digital visual content that was not used to train the parameter adjustment model. In at least some implementations, the subsequent item of digital visual content is not associated with a corrected item of digital visual content and may be, for example, the digital visual content 116 of FIG. 1. In other implementations, the subsequent item of digital visual content is an image withheld from the training data for purposes of validation. In an example where the training data includes 5000 images, 4500 of the images are used to train the parameter adjustment model and 500 images are reserved for validation of the trained parameter adjustment model.

Parameter values are generated that are configured to adjust the subsequent item of digital visual content by processing the subsequent item of digital visual content with the parameter adjustment model (block 608). The parameter values may optionally be applied to the subsequent item of digital visual content, e.g., by the content editing application 114 of FIG. 1, to create a modified image. The parameter values are output (block 610). For instance, the parameter values may be displayed in a user interface, may be output in conjunction with tools to alter the parameter values, and so forth.

Figure 7:
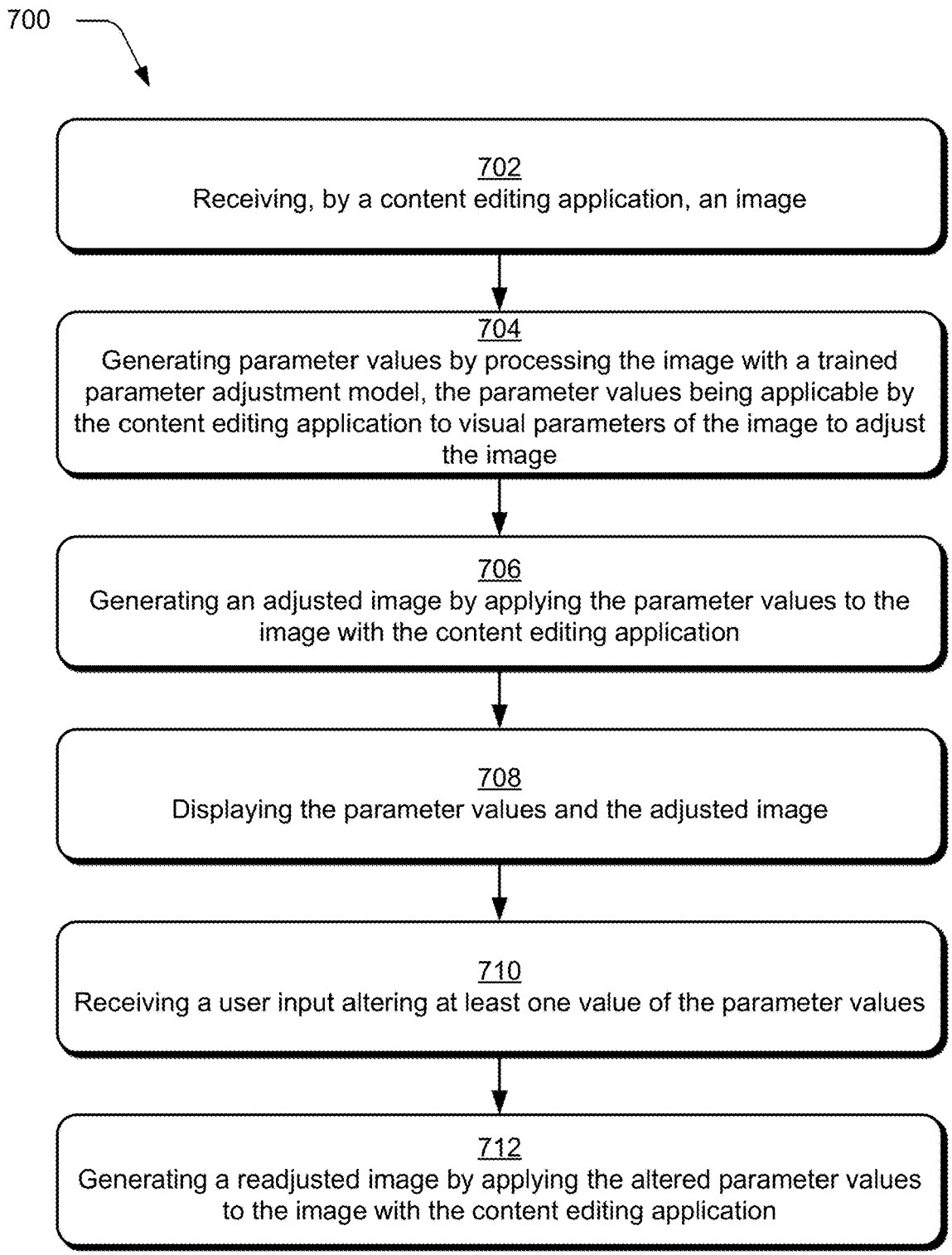
FIG. 7 is a flow diagram depicting a procedure in an example implementation of automatic digital parameter adjustment techniques.

FIG. 7 depicts a procedure 700 in an example implementation of automatic digital parameter adjustment techniques. An image is received by a content editing application (block 702). For instance, the content editing application 114 of FIG. 1 receives the digital visual content 116 as part of operations to access or open the digital visual content 116.

Parameter values are generated by processing the image with a trained parameter adjustment model, the parameter values being applicable by the content editing application to visual parameters of the image to adjust the image (block 704). For example, the parameter values that are generated by the trained parameter adjustment model correspond to visual parameters designated by the content editing application, and thus the parameter values may be applied by the content editing application to adjust the image. The trained parameter adjustment model may be, for instance, the parameter adjustment model 112 as described with respect to FIGS. 1-5, and is configured to process digital visual content to generate parameter values with respect to the digital visual content. In at least some implementations, the parameter adjustment model is generated by a digital analytics system, and once trained is communicated via a network to a client device. The content editing application of the client device utilizes the parameter adjustment model to process the digital visual content. As the client device receives a trained parameter adjustment model, the client device benefits from the machine learning techniques without itself performing the machine learning techniques, thus preserving resources and allowing the client device to quickly and easily generate parameter values for an input image. In at least some implementations, the client device includes multiple different trained parameter adjustment models, allowing a user to select a particular parameter adjustment model for use in generating parameter values for the input image.

An adjusted image is generated by applying the parameter values to the image with the content editing application (block 706). As the parameter adjustment model 112 generates parameter values and not an adjusted image directly, the content editing application utilizes the parameter values to generate an adjusted image by using code modules of the content editing application itself. In at least some implementations, the input image is a frame of a video, and the predicted parameter values are applied to a plurality of frames of the video to create a plurality of adjusted images.

The parameter values and the adjusted image are displayed (block 708). For instance, the parameter values and the adjusted image are displayed via graphical interface components of a user interface displayed on the display device 122 of the client device 104 of FIG. 1. In at least some implementations, parameter values were generated according to multiple different parameter adjustment models, and multiple different adjusted images are displayed for selection via a user input, allowing a user to select a single adjusted image for further processing.

A user input is received altering at least one value of the parameter values (block 710). For instance, a user input provides new parameter values that override the predicted parameter values, such as by adjusting the predicted parameter values via a slider, text input, or so forth.

A readjusted image is generated by applying the altered parameter values to the image with the content editing application (block 712). The content editing application generates a new, readjusted image by applying the altered parameter values to the original input image. The readjusted image may then be output.

Having discussed some example procedures, consider now a discussion of an example system and device in accordance with one or more implementations.

Example System and Device

Figure 8:
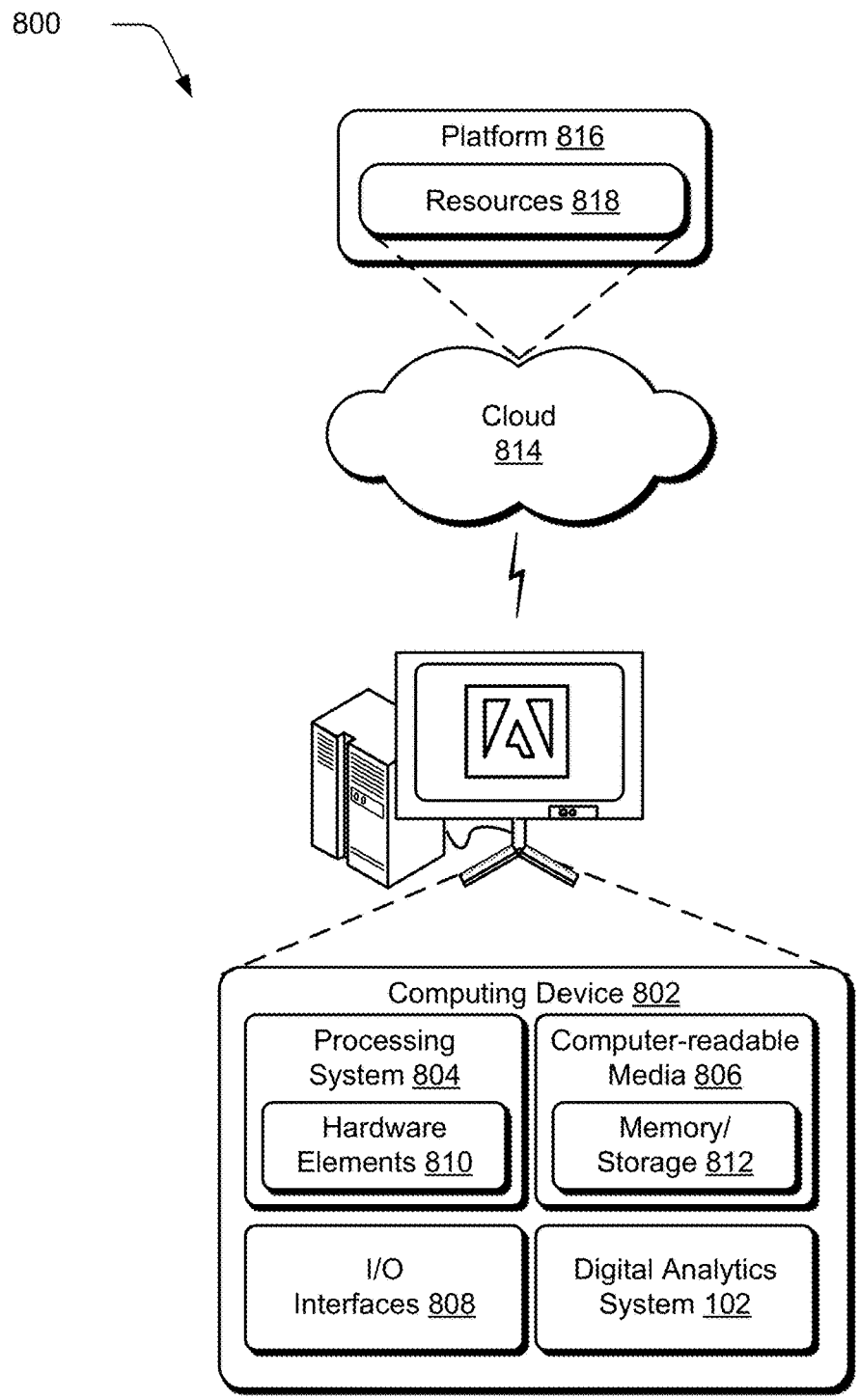
FIG. 8 illustrates an example system including various components of an example device that can be implemented as any type of computing device as described and/or utilized with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the digital analytics system 102. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment for automatic digital parameter adjustment, a method implemented by at least one computing device, the method comprising:
   receiving, by a content editing application of the at least one computing device, an image;
   generating, by the at least one computing device, parameter values by processing the image with a trained parameter adjustment model, the parameter values being applicable by the content editing application to visual parameters of the image to adjust the image;
   generating, by the at least one computing device, an adjusted image by applying the parameter values to the image with the content editing application;
   displaying, on a display device of the at least one computing device, the parameter values and the adjusted image;
   receiving, by the at least one computing device, a user input altering at least one value of the parameter values; and
   generating, by the at least one computing device, a readjusted image by applying the altered parameter values to the image with the content editing application.

2. The method of claim 1, wherein the image is a frame of a video, the method further comprising generating a plurality of readjusted images for a plurality of frames of the video based on the altered parameter values.

3. The method of claim 1, wherein the visual parameters of the image include a color or white balance parameters, a tonal adjustment parameter, and a color fullness parameter.

4. The method of claim 1, wherein the visual parameters of the image include temperature, tint, exposure, contrast, highlights, shadows, whites, blacks, and saturation.

5. The method of claim 1, wherein the generating the parameter values is performed for each of a plurality of trained parameter adjustment models, the method further comprising displaying a plurality of adjusted images prior to the displaying the parameter values and the adjusted image.

6. The method of claim 5, further comprising receiving, subsequent to the displaying the plurality of adjusted images and prior to the displaying the parameter values and the adjusted image, a user input selecting one of the plurality of adjusted images, and wherein the displaying the parameter values and the adjusted image is performed with respect to the selected adjusted image.

7. The method of claim 1, further comprising receiving, prior to generating the parameter values, a user input selecting one of a plurality of trained parameter adjustment models, and wherein the generating the parameter values is performed with respect to the selected trained parameter adjustment model.

8. The method of claim 1, wherein the trained parameter adjustment model is created by training a machine learning model based on a loss function using a plurality of pairs of images as a training input, the plurality of pairs of images each respectively including a base image and a corresponding corrected image.

9. The method of claim 8, wherein the machine learning model is further configured to:
generate predicted parameter values for a base image; and
compare the predicted parameter values to a corresponding corrected image.

10. The method of claim 8, wherein the machine learning model is further configured to:
generate predicted parameter values for a base image;
generate a modified image by applying the predicted parameter values to the base image; and
compare the modified image to the corrected image.

11. The method of claim 10, wherein the loss function determines a pixel-wise loss between the modified image and the corrected image.

12. The method of claim 8, wherein the machine learning model determines a gradient of loss with respect to each of a plurality of parameters.

13. In a digital medium environment for automatic digital parameter adjustment, a system comprising:
a parameter adjustment module implemented at least partially in hardware of a computing device, the parameter adjustment module configured to:
receive an image; and
generate parameter values by processing the image with a trained parameter adjustment model, the parameter values being applicable by a content editing application to visual parameters of the image to adjust the image; and
the content editing application implemented at least partially in hardware of the computing device, the content editing application configured to:
generate an adjusted image by applying the parameter values to the image;
display the parameter values and the adjusted image;
receive a user input altering at least one value of the parameter values; and
generate a readjusted image by applying the altered parameter values to the image with the content editing application.

14. The system of claim 13, wherein the image is a frame of a video, the content editing application further configured to generate a plurality of readjusted images for a plurality of frames of the video based on the altered parameter values.

15. The system of claim 13, wherein the visual parameters of the image include temperature, tint, exposure, contrast, highlights, shadows, whites, blacks, and saturation.

16. The system of claim 13, the content editing application further configured to receive, prior to generating the parameter values, a user input selecting one of a plurality of trained parameter adjustment models, and wherein the parameter adjustment module is further configured to generate the parameter values with respect to the selected trained parameter adjustment model.

17. The system of claim 13, the trained parameter adjustment model created by training a machine learning model based on a loss function using a plurality of pairs of images as a training input, the plurality of pairs of images each respectively including a base image and a corresponding corrected image.

18. In a digital medium environment for automatic digital parameter adjustment, a system comprising:
means for receiving an image;
means for generating parameter values by processing the image with a trained parameter adjustment model, the parameter values being applicable by a content editing application to visual parameters of the image to adjust the image;
means for generating an adjusted image by applying the parameter values to the image with the content editing application;
means for displaying the parameter values and the adjusted image;
means for receiving a user input altering at least one value of the parameter values; and
means for generating a readjusted image by applying the altered parameter values to the image with the content editing application.

19. The system of claim 18, wherein the image is a frame of a video, the system further comprising means for generating a plurality of readjusted images for a plurality of frames of the video based on the altered parameter values.

20. The system of claim 18, wherein the visual parameters of the image include temperature, tint, exposure, contrast, highlights, shadows, whites, blacks, and saturation.

* * * * *